United States Patent [19]
Lang

[11] 4,132,373
[45] Jan. 2, 1979

[54] MANNED SPACE FLIGHT BODY

[76] Inventor: Günther Lang, Triesterstrasse 388, Graz, Austria, A-8055

[21] Appl. No.: 767,299

[22] Filed: Feb. 10, 1977

[30] Foreign Application Priority Data

Feb. 11, 1976 [AT] Austria ............................ 956/76

[51] Int. Cl.² ................................................ B64G 1/00
[52] U.S. Cl. .................................... 244/159; 214/331; 244/118 R; 244/120
[58] Field of Search ................................ 244/158–163, 244/172, 118 R, 118 P, 120; 214/16.1 A, 16.4 R, 16.4 A, 701 Q, 730, 660, 331; 70/116, 120; 312/338, 235, 239; 104/246, 88

[56] References Cited

U.S. PATENT DOCUMENTS

| | | | |
|---|---|---|---|
| 2,819,629 | 1/1950 | Johnson et al. | 70/116 |
| 3,143,081 | 8/1964 | Dolphin et al. | 104/246 |
| 3,144,219 | 8/1964 | Schnitzer | 244/161 |
| 3,179,208 | 4/1965 | Umanoff | 24/118 P |
| 3,332,640 | 7/1967 | Nesheim | 244/159 |
| 3,709,447 | 1/1973 | Devlin | 244/158 |
| 3,737,117 | 6/1973 | Belew | 244/161 |
| 3,820,741 | 6/1974 | Ratcliff | 244/161 |
| 3,952,976 | 4/1976 | Fletcher et al. | 244/161 |

OTHER PUBLICATIONS

Ordway, "2001: A Space Odyssey", *Spaceflight*, Mar. 1970, pp. 110–116.
Cepollina et al., "In Orbit Servicing", Astronautics and Aeronautics, Feb. 1975, pp. 48–56.
"Space Shuttle", NASA Lyndon B. Johnson Space Center, Houston, Texas, Feb. 1975, pp. 14–15.
"Automatic Warehouses for Containers", Mechanical Handling, Jul. 1967, p. 9.

*Primary Examiner*—Galen L. Barefoot
*Attorney, Agent, or Firm*—Kurt Kelman

[57] ABSTRACT

A manned space flight body comprises a cylindrical shell and a shelf construction built into the axially extending, elongated cell defined by the shell. The shelf construction has a shape resembling a hollow prism and is comprised of a plurality of individual, radially extending and axially adjacent storage rooms for various systems used in space flight, and an axially extending operating room is in the free center of the cell surrounded by the shelf construction. All the storage rooms are accessible from the central operating room which is arranged to permit movement therethrough for access to the storage rooms.

14 Claims, 52 Drawing Figures

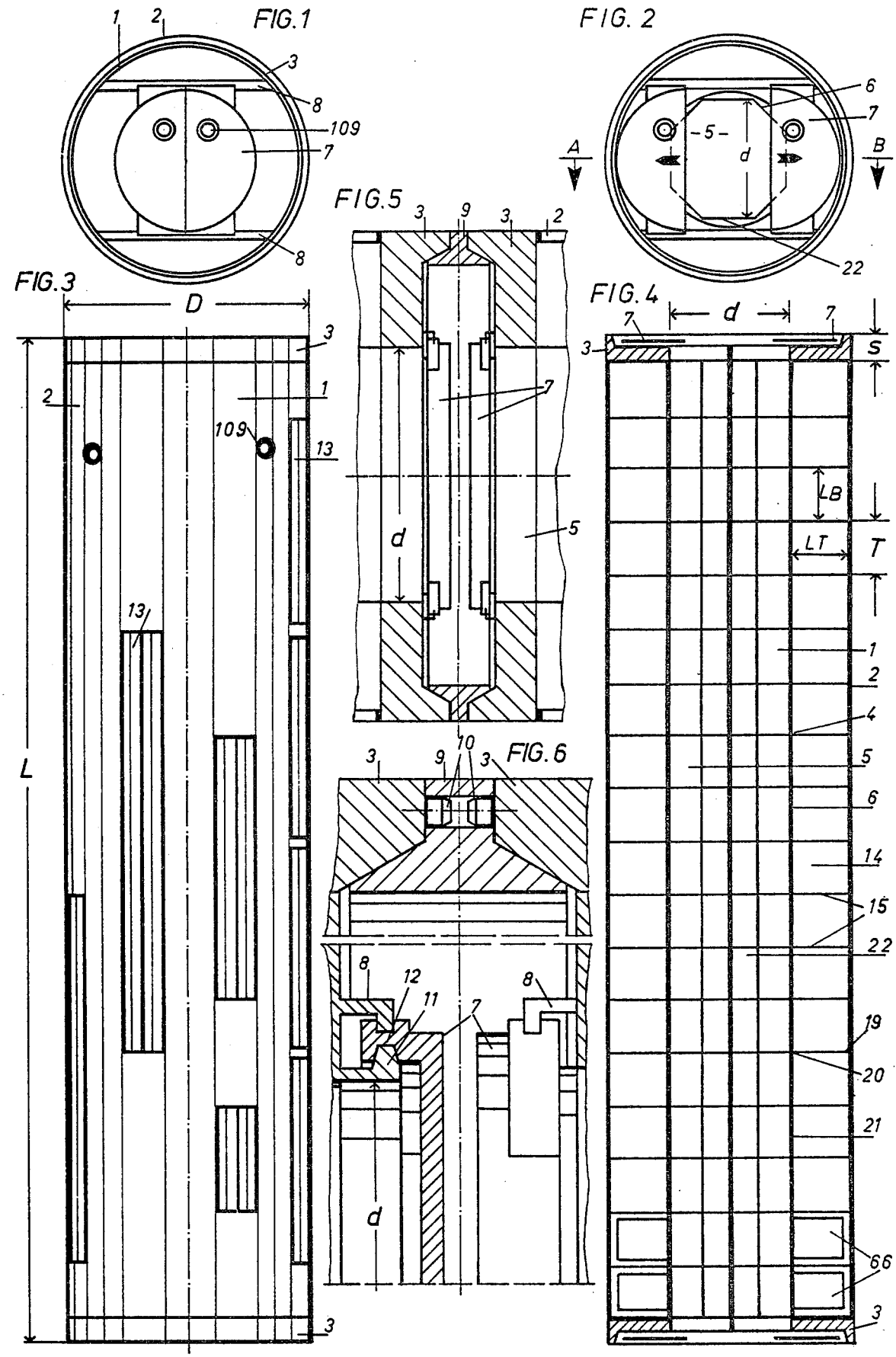

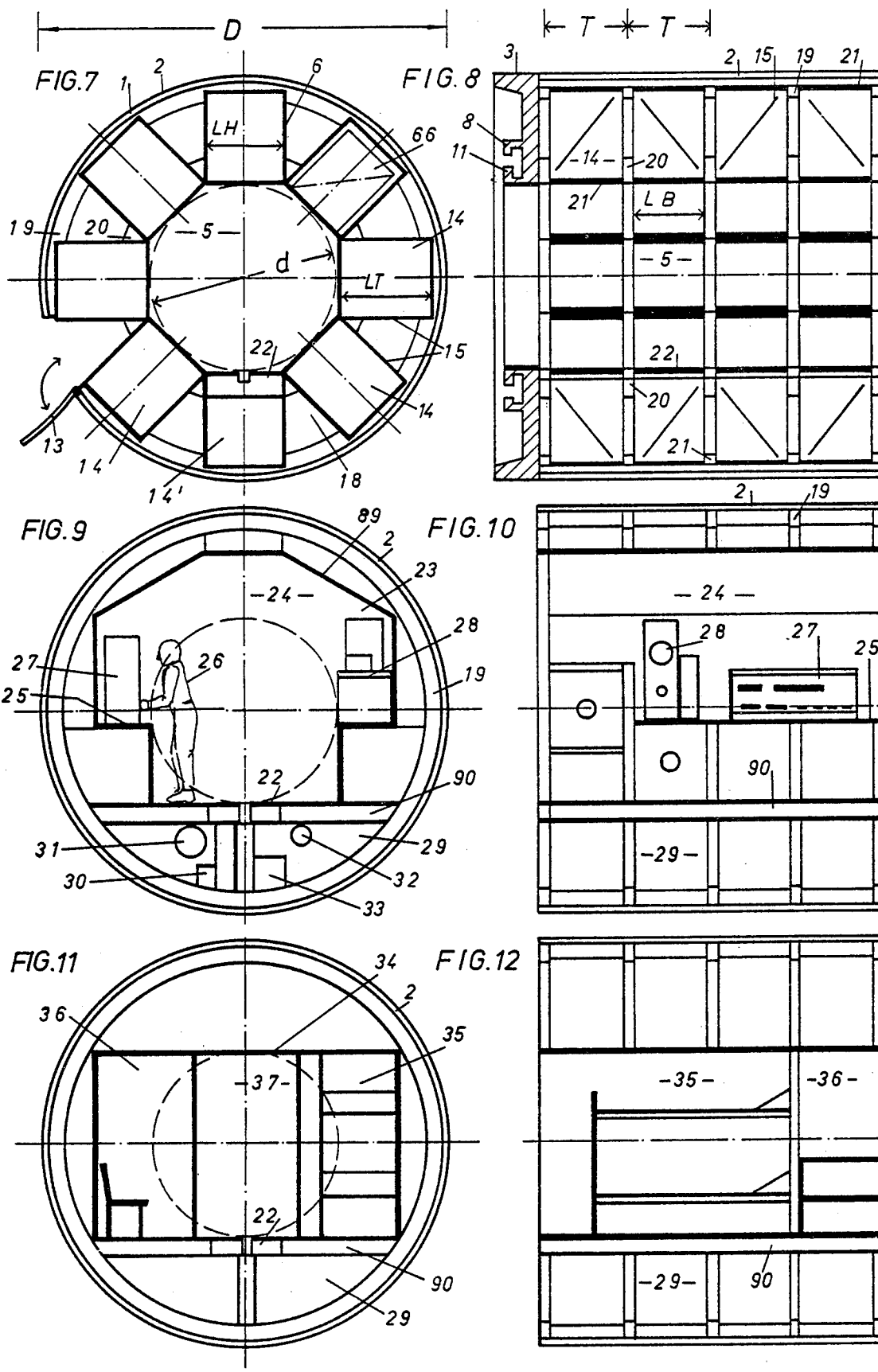

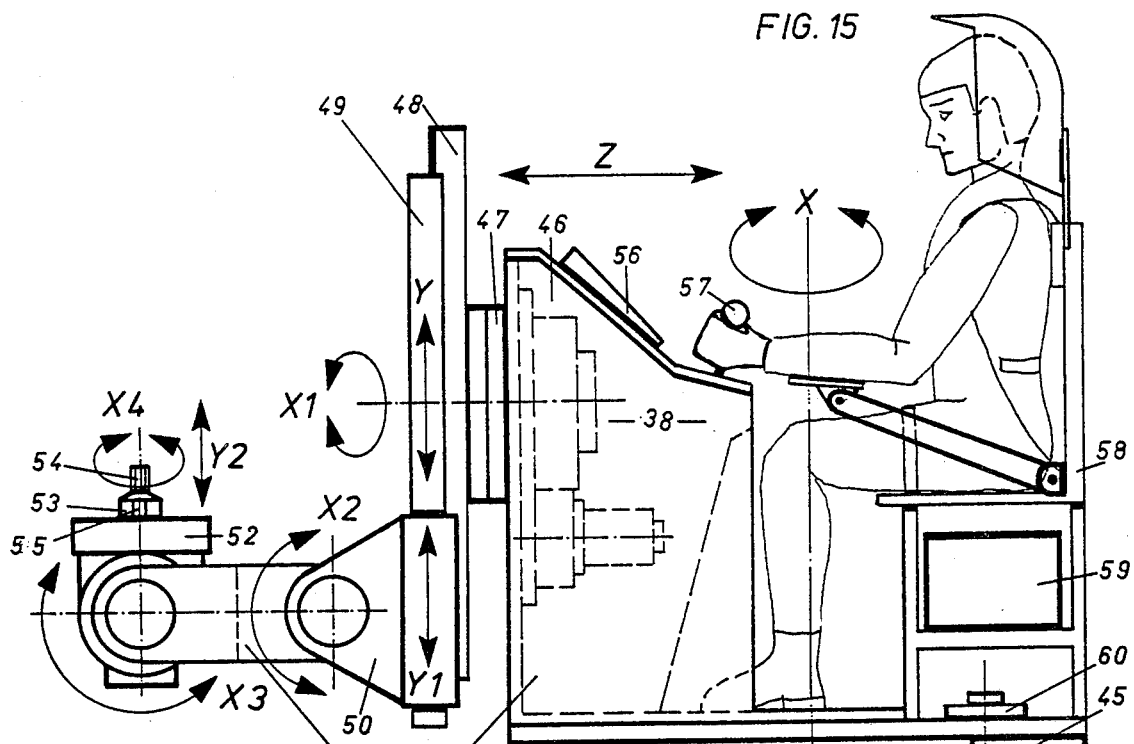
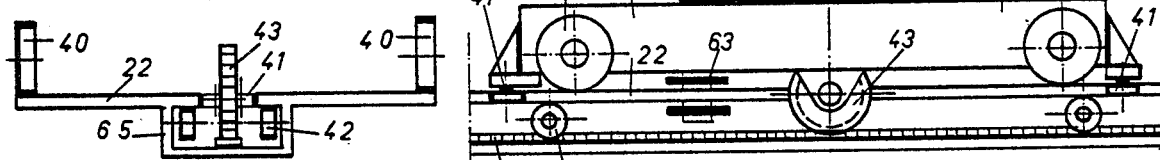
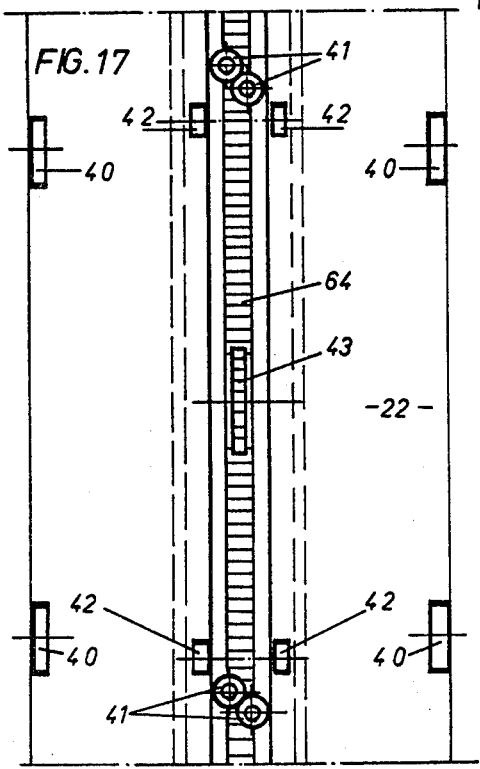
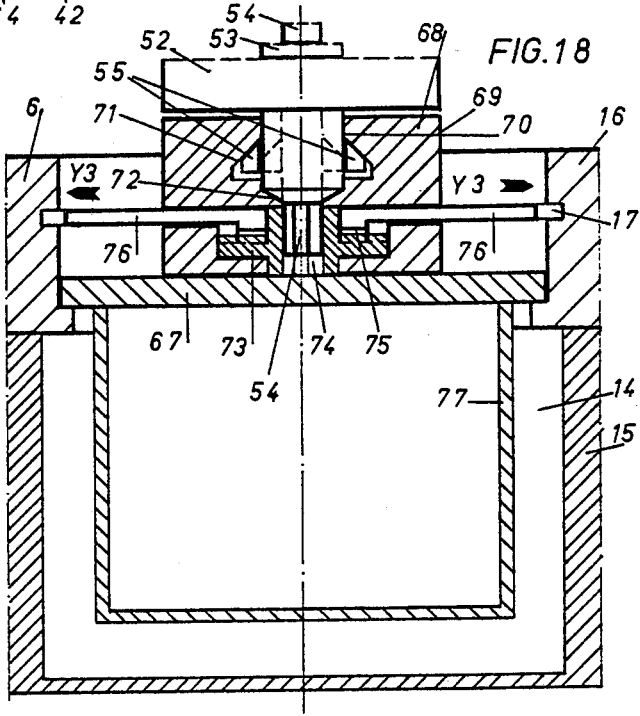

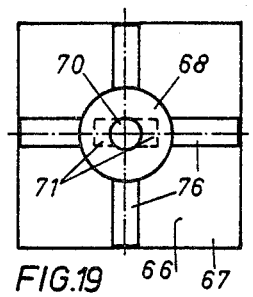
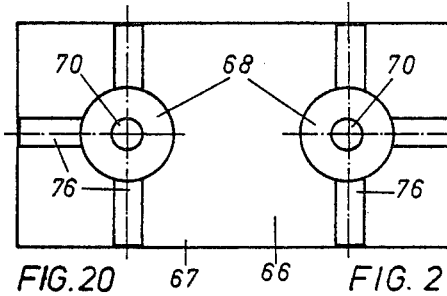
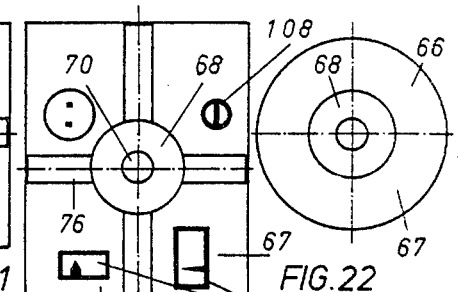
FIG.19  FIG.20  FIG.21  FIG.22
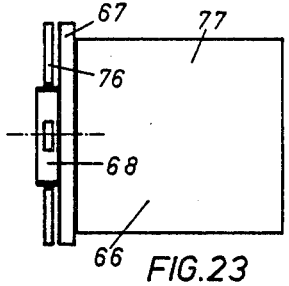
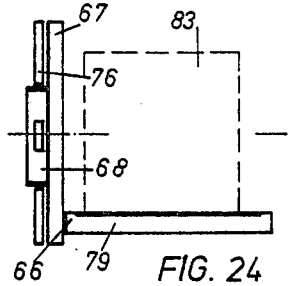
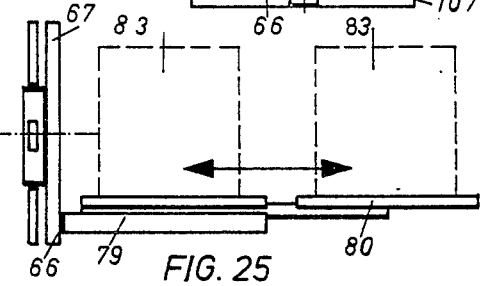
FIG.23  FIG.24  FIG.25
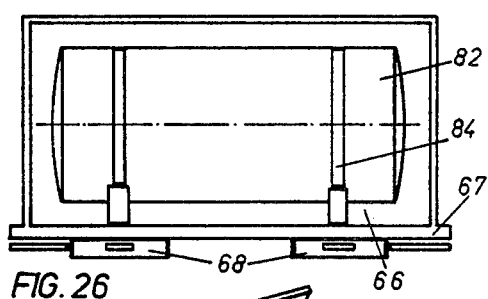
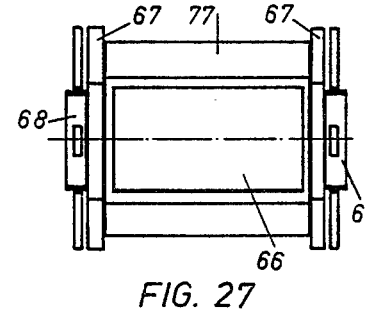
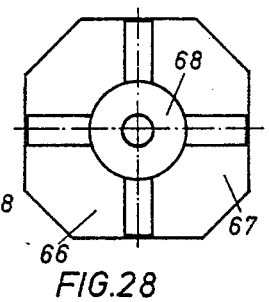
FIG.26  FIG.27  FIG.28
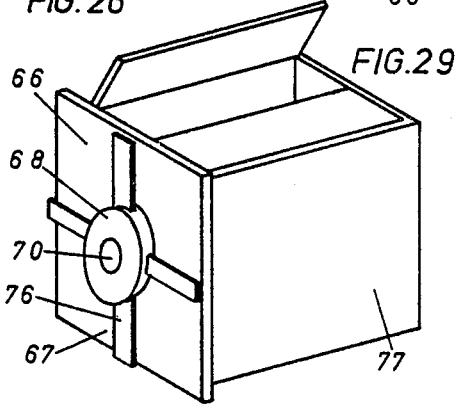
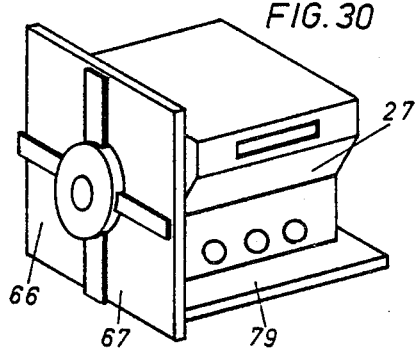
FIG.29  FIG.30
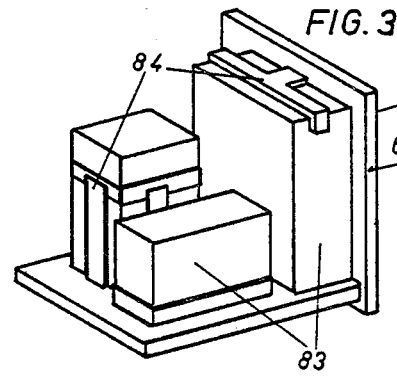
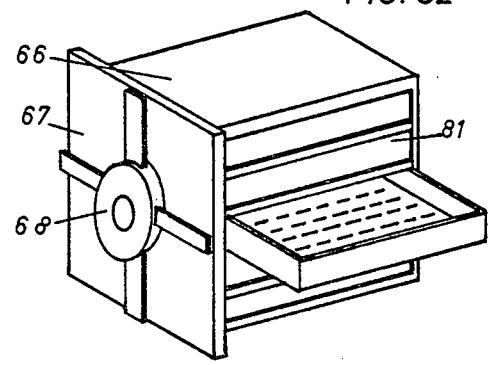
FIG.31  FIG.32

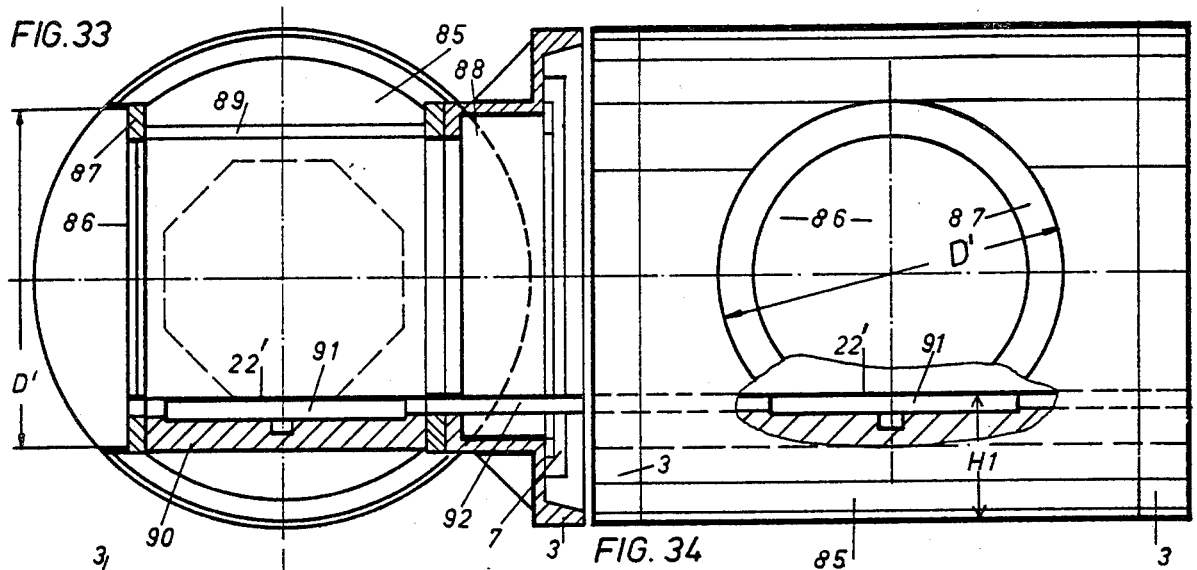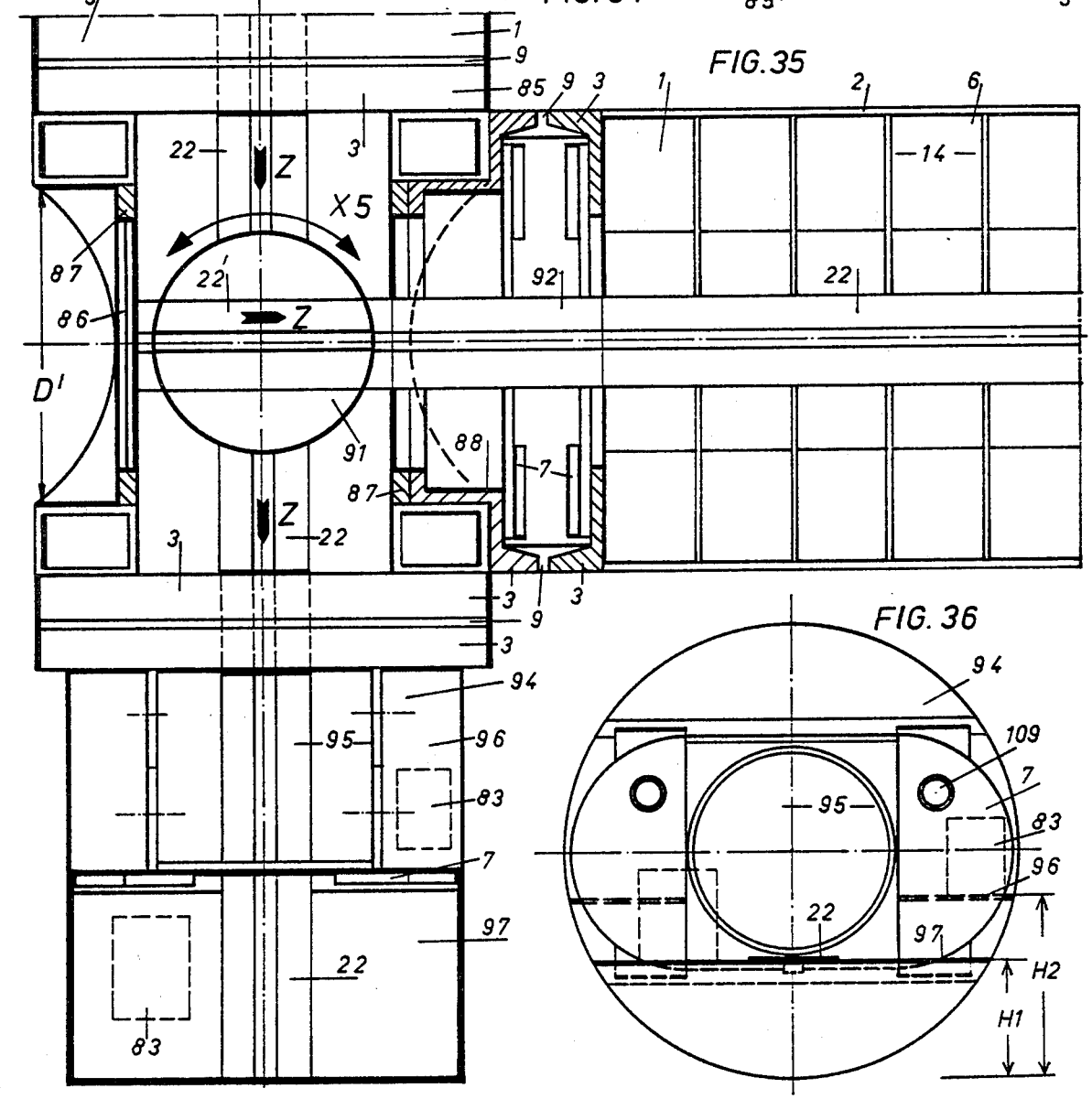

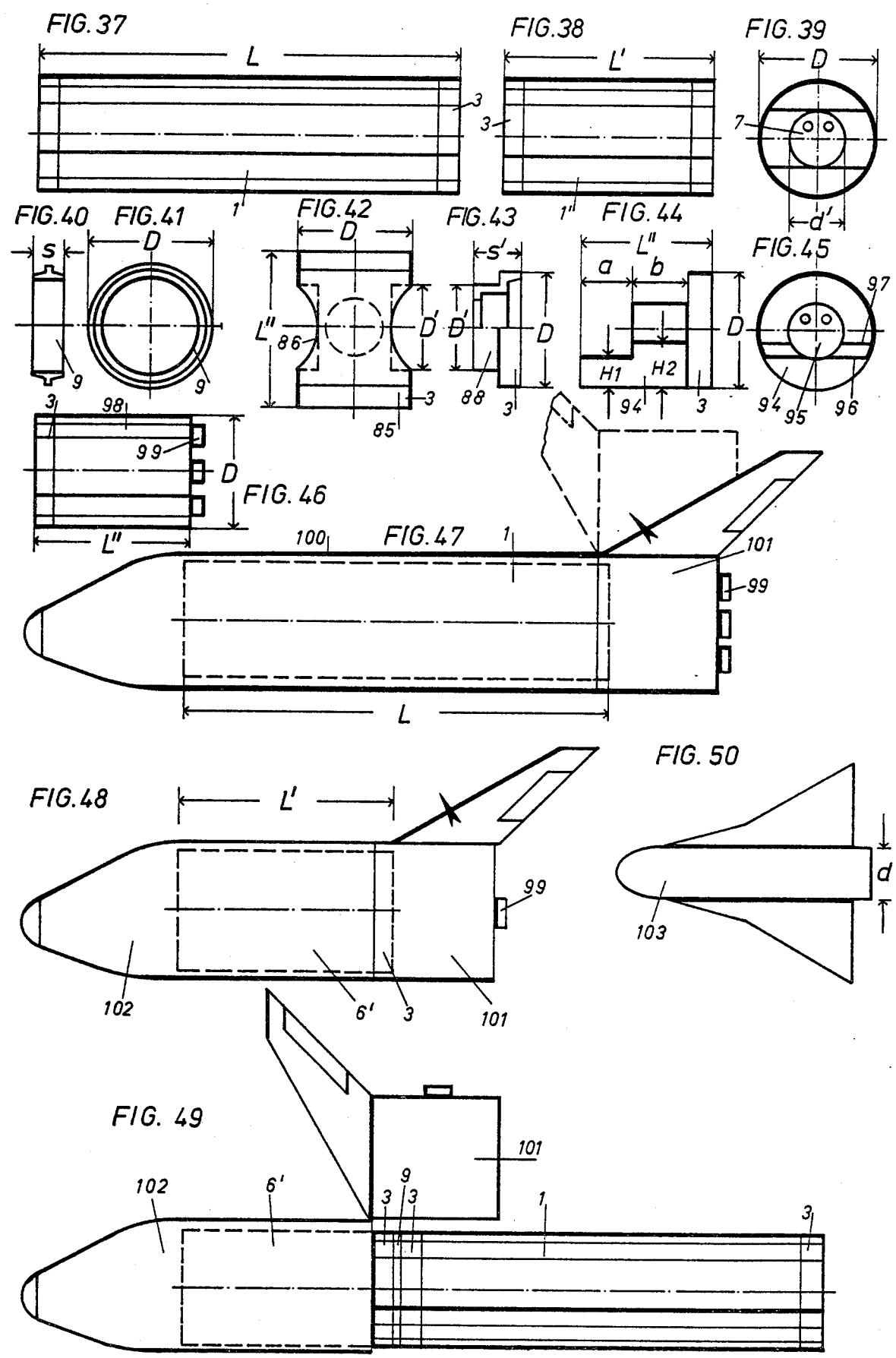

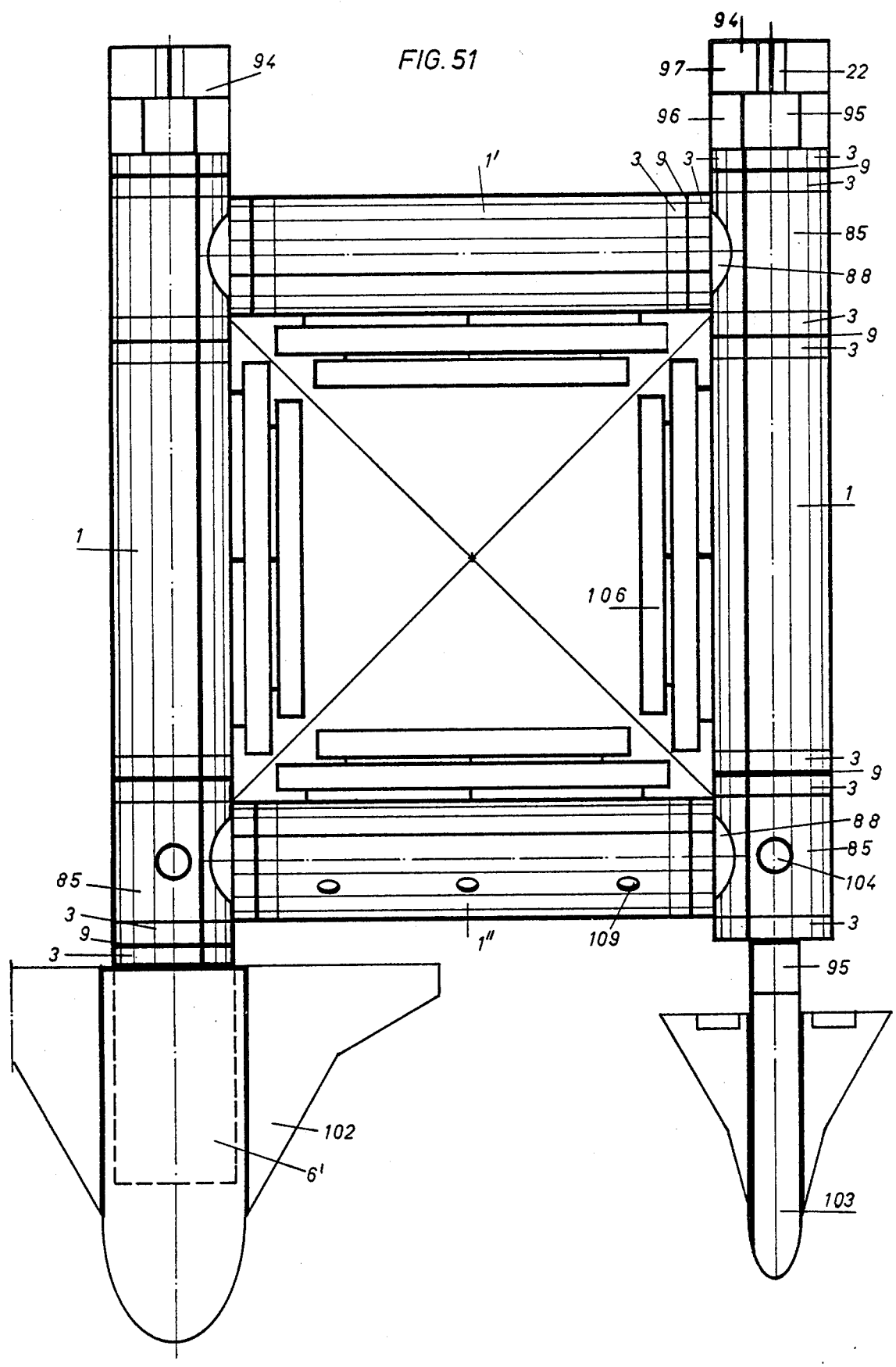

MANNED SPACE FLIGHT BODY

The invention relates to a manned, air pressurized space flight body in the form of a space depot capable of being reconstructed and combined, with shelf servicing unit, pallets and a space pallet transporter.

Space flight bodies known or proposed heretofore have a small capacity for instruments, material and personnel. As disadvantages are indicated: the dwell time of such flight bodies in space is limited and relatively short, for example 7 to 30 days. After each completed research or production program, the flight body must be returned to earth with the aid of a space transporter. The built-in laboratory instruments and production apparatus can be replaced, changed or repaired only on earth and not in space. The production of materials is possible only in the smallest amounts and involves high costs. There is no capacity for storing larger amounts of provisions, finished goods, instruments, apparatus and replacement parts. A combination to obtain larger space bodies is not possible.

It is the object of the invention to produce a new space flight body and transport system for goods, which avoids the above-mentioned disadvantages and additionally has further advantages.

This is achieved in accordance with the invention with a new, manned, air pressurized, combinable, space depot which is capable of being enlarged and reconstructed, and which may be loaded with new pallets or unloaded on earth as well as in space, with a space shelf servicing unit developed for the interior transport of goods and being rail-bound, dependent on the shelf and fully functional in all positions, additional space bodies and structural parts and a space pallet transporter complementing the system according to the invention.

The space depot according to the invention has preferably a cylindrical shape and is interiorly equipped with a radial shelf installation developed for space and suitable for the secure, closed, spatially economical storage of goods of all types in space, the goods being stationarily stowed in space pallets of different structures.

The cell-shaped structure of the flight body also permits the selective building in of laboratory sites with devices for scientific research or working sites with production installations for the manufacture of materials, structural parts and devices, instead of shelf parts. It is possible to adapt the individual working sites to any research or production program since, for example, devices mounted in the laboratory may be removed in a brief manual operation and other devices, which were stored in the depot, may be built in there-instead. The reconstruction and transport is effected with the use of the space shelf control unit which is equipped, for this purpose, with various auxiliary assembly tools. It is also provided that the devices and apparatus in the shelf may be operated for their task in situ; in such cases, the front plates of the pallets carry the required connections, switches, openings and the like.

It is easy to build in crew and office rooms in various designs instead of the shelf parts.

The space flight body of this invention may be used solely as space depot or as space depot with built-in laboratory and/or crew rooms or as a multi-part space station.

A space transporter is used to place the space depot in orbit. A separate pallet transporter equipped with a radial shelf is used to deliver and remove the space goods.

The space depot consists of an outer enclosure equipped at a few locations with tightly closable hatches of different sizes and, if desired, with portholes. The cellular carrier framework consists essentially of outer and inner annular girders which are connected by elongated beams. It is also possible to construct the shelf so that it simultaneously constitutes the cellular construction to reduce the weight of the structure. The built-in radial shelf preferably has the shape of an octagonal hollow prism. Seven storage rooms can be reached in a radial direction from the octagonal operating room. The eighth plane is formed by the track of the space shelf control unit. The individual storage rooms are tightly closed from one another and, if needed, are provided with outer hatches. The storage rooms serve to receive the new space pallets. The installation and removal of the pallets is effected by the new space shelf servicing unit. The size, shape and spacing of the storage rooms is normally uniform. However, changes can be made. The track serves for the accurate guidance of the space shelf servicing unit and, in the center, it is C-shaped and provided with a rack. Diverse subsidiary systems and auxiliary installations are in the bottom space under the track. The space pallets are adapted to the storage rooms and may have square, rectangular, polygonal, oval or circular front plates. Mechanical, hydraulic or electric locking devices serve to fix the pallets in the radial shelves. The space pallets may be made with storage containers, storage closets, open support surfaces and the like, and they are equipped with fastening elements for the most varied devices and materials.

The space depot is tightly closed at each of its two end faces with a respective connecting plate. One embodiment provides a two-part closure construction with portholes, which is drawn apart in a plane. The connection of two space flight bodies is effected by means of the conical parts of the connecting plate and a coupling ring equipped with double conical parts. Ducts, containers, devices, projectible solar cells and the like are built into the individual triangular wedge-shaped rooms of the radial shelf.

A new space shelf servicing unit has been developed for the space depot, which is so exactly guided by upper running wheels, lateral guide rollers and lower guide rollers that it is always positioned perpendicularly on the track and is fully functional in every position of the flight body. This unit is self-propelled, rail-bound, dependent on the shelf and is usually operated by a driver; it consists essentially of an undercarriage enabling an accurate, rectilinear movement, of an exact and dependable drive and a braking device which has absolute braking ability in every position, of a chassis which serves to receive the undercarriage, the drive and the pivotally mounted instrument block, of the pivotally mounted instrument block which is mounted with a pivot pin on a base frame. The base frame carries the instrument box wherein there is arranged the drive and the bearing for the pivotal arm. The instrument box also carries all indicating instruments, switches and control levers for the shelf servicing unit. The pivotal arm which is pivotal through an arc of 180° may be fixed accurately in each position. It carries a rectilinearly movable telescoping slide on which there is arranged a movable instrument slide. A short, pivotal, fork-shaped arm is mounted thereon, the rotatable receiving bushing for the pallet being arranged in the fork opening of the arm. This receiving bushing serves, on the one hand, for fixedly receiving pallets and other devices during the transport or operation and, on the other hand, the space pallets are fixedly connected by the locking device with the radial shelf by the receiving bushing or are removed from the shelf. The operator's seat with adjustable arm rests and a head protector is arranged at the rear side of the base frame and a battery providing energy is mounted under the seat. The shelf servicing unit is so constructed that it may be rotated 180° in the operating room.

Within the scope of the invention, it is possible to build the space shelf servicing unit also in other embodiments. Many variations are available with respect to the drive, the control, the motion systems, the construction of the bushing for receiving the pallets. The unit may also be used for assembly, repair, and other work. For these purposes, tools, appliances, astronaut seats, manipulators and the like may, for example, be carried by the receiving bushing and may be operated from the driver's seat. The supply of current of the unit may be effected by conduits.

Every point of the space depot can be reached with the shelf servicing unit. In combined space bodies, the servicing unit may be moved through the coupling cells by turntables to each installation. The loading of pallets from and to a pallet transporter coupled in space is also effected by the shelf servicing unit.

The coupling cells are equipped with a total of 2, 3, 4, 5 and 6 connecting points for connecting laterally or transversely arranged space bodies. Special connecting rings are provided for the transverse connection of space bodies. The dimensioning and the structure of the cell is adapted to the construction of the space depot.

Another supplement is constituted by the outer space platform for storing pallets, appliances and material in free space. One embodiment has different platform heights, individual platforms being reachable through locks from the shelf control unit.

Propulsion cells, for example with stationary or rotatable or adjustable propulsion units of different strength can be coupled on to propel individual or several space depots or space stations in space.

For the sake of completeness, it is noted that the space depot has all required subsidiary systems for sustaining life, supplying energy, storage control, thermal controls, etc.

A space transporter is used to transport the space depot into space, the tail thereof being pivotal upwardly so that loading and unloading of the space depot is easily possible. Docking is accomplished with special propulsion units.

The transport of the pallets from earth to the space depot is effected by a space pallet transporter. This has in its interior a movable shelf installation identical to the space depot and equipped with an identical connecting element with closure and coupling ring so that the connection between pallet transporter and space depot may be effected. The exchange of the pallets is carried out with the shelf control unit. The tail of the transporter is pivoted upwardly during docking.

The production and research activity can be substantially expanded but also made more rational, productive and inexpensive with the manned, combinable space depot with shelf servicing unit and pallets of the invention.

A space flight apparatus may be connected to the cell of the space depot and carried with it for the rescue of astronauts from other space bodies.

The subject matter of the invention is further elucidated in the figures of the drawing sheets.

Sheet 1 shows in

FIG. 1 the circular connecting plate of the space depot with closed closure,

FIG. 2 the connecting plate with the opened closure halves,

FIG. 3 is a plan view of a cylindrically shaped space depot,

FIG. 4 is a horizontal section (along line A-B of FIG. 2) of the space depot,

FIG. 5 is a partial section of the coupling location of two space depots connected to each other, FIG. 6 the construction of the connecting elements of the closure and the connecting ring.

Sheet 2 shows in

FIG. 7 the cross section of a space depot according to the invention,

FIG. 8 a portion of the longitudinal section thereof,

FIG. 9 a built-in laboratory room,

FIG. 10 is a portion of the longitudinal section thereof,

FIG. 11 the cross section, and

FIG. 12 the longitudinal section of built-in crew quarters.

Sheet 3 shows in

Figure 13:
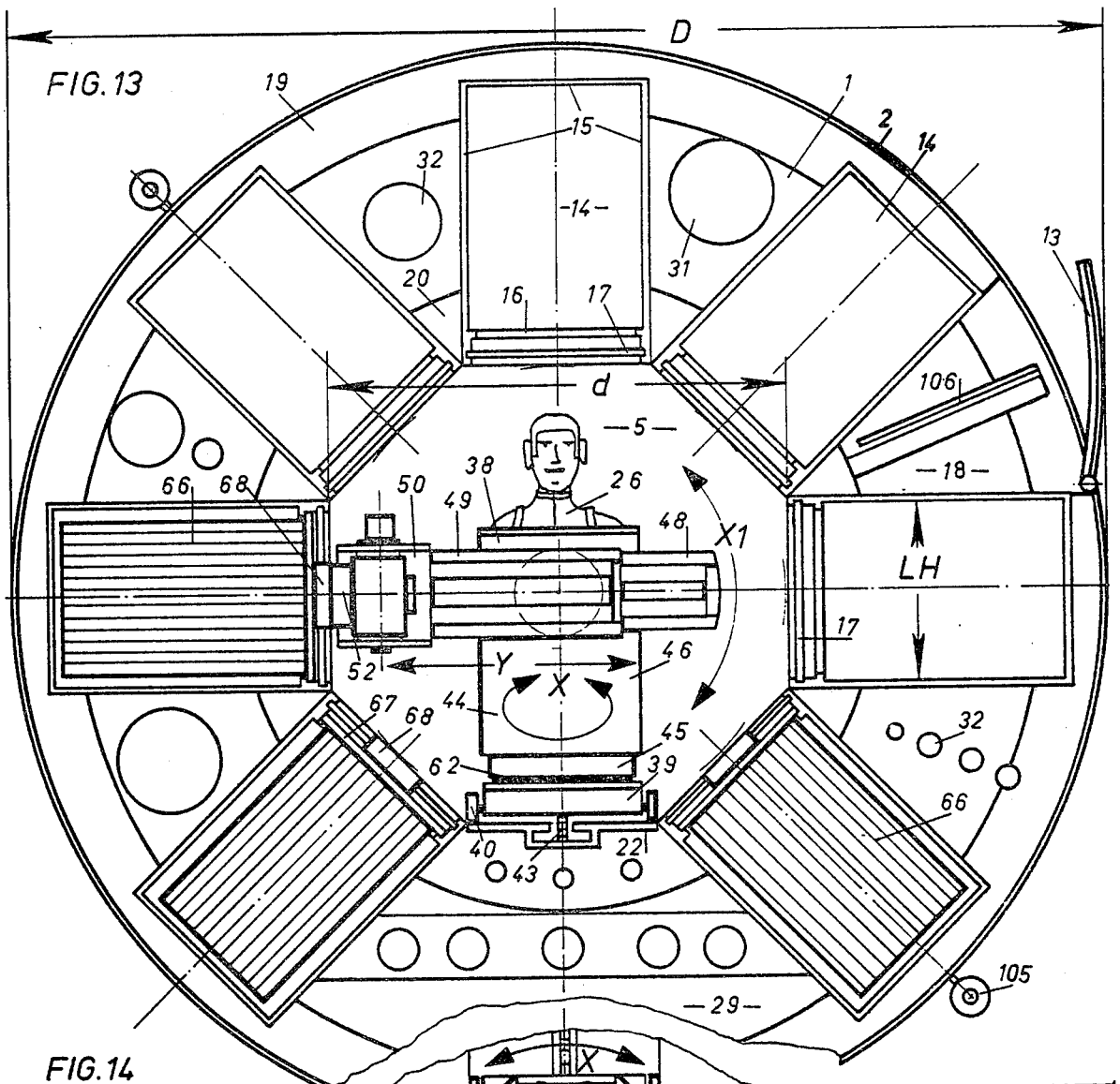
Figure 14:
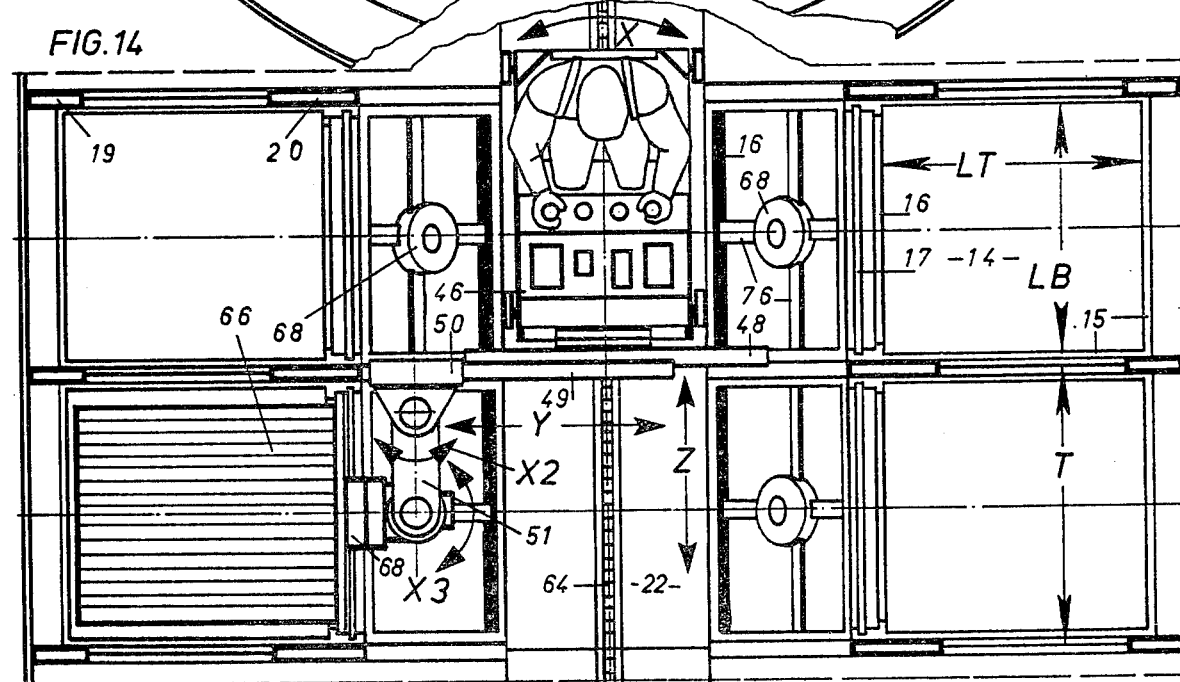

FIG. 13 the cross section of a space depot with a space shelf servicing unit,

FIG. 14 the corresponding horizontal section.

Sheet 4 shows in

FIG. 15 the side elevational view of a space shelf servicing unit,

FIG. 16 the cross section of the track for the shelf servicing unit with the arrangement of the running wheels, guide and drive rollers of the unit, FIG. 17 a plan view of the track with the roller arrangement of the unit, FIG. 18 the partial section of the pallet receiving bushing of the shelf servicing unit and the locking device of a space pallet, Several embodiments of space pallets are illustrated on sheet 5.

FIGS. 19, 20 and 21 show front plates of square, rectangular and round shape. The front plate of FIG. 21 is equipped with devices, instruments and switches.

FIG. 22 shows a round front plate.

FIG. 23 shows a side elevational view of a space container pallet while

FIGS. 24 and 25 contain open space pallets.

FIG. 26 illustrates a double pallet and

FIGS. 27 and 28 show octagonal space container pallets.

FIG. 29 illustrates a space storage container,

FIGS. 30 and 31 each illustrate a loaded space pallet and

FIG. 32 illustrates a space tool chest.

Sheet 6 shows in

FIG. 33 the cross section of a coupling cell with turntable,

FIG. 34 the corresponding side elevational view and

FIG. 35 the horizontal section.

FIG. 36 is a front elevational view of the space platform shown in FIG. 35 in plan view.

Sheet 7 shows a space depot and a combination of the essential additional structural parts as well as a normal space transporter and a pallet transporter.

FIG. 37 shows a normal space depot,

FIG. 38 a shortened modification thereof,

FIG. 39 the corresponding side elevation,

FIG. 40 shows the cross section of the coupling ring whose side elevation is shown in FIG. 41.

FIG. 42 shows a coupling body with turntable and four connections,

FIG. 43 shows the associated, ring-shaped connecting part.

FIG. 44 illustrates a space outer platform whose side elevation is shown in FIG. 45.

FIG. 46 shows a propulsion unit which may be coupled on,

FIG. 47 illustrates the front elevational view of a space transporter with a space depot shown in broken lines.

FIG. 48 shows a pallet space transporter with built-in space shelf.

FIG. 49 shows a pallet space transporter which is connected to a space depot.

FIG. 50 illustrates a space rescue flight apparatus.

Sheet 8.

FIG. 51 shows an orbiting space station consisting of four space depots.

Sheet 9.

Figure 52:
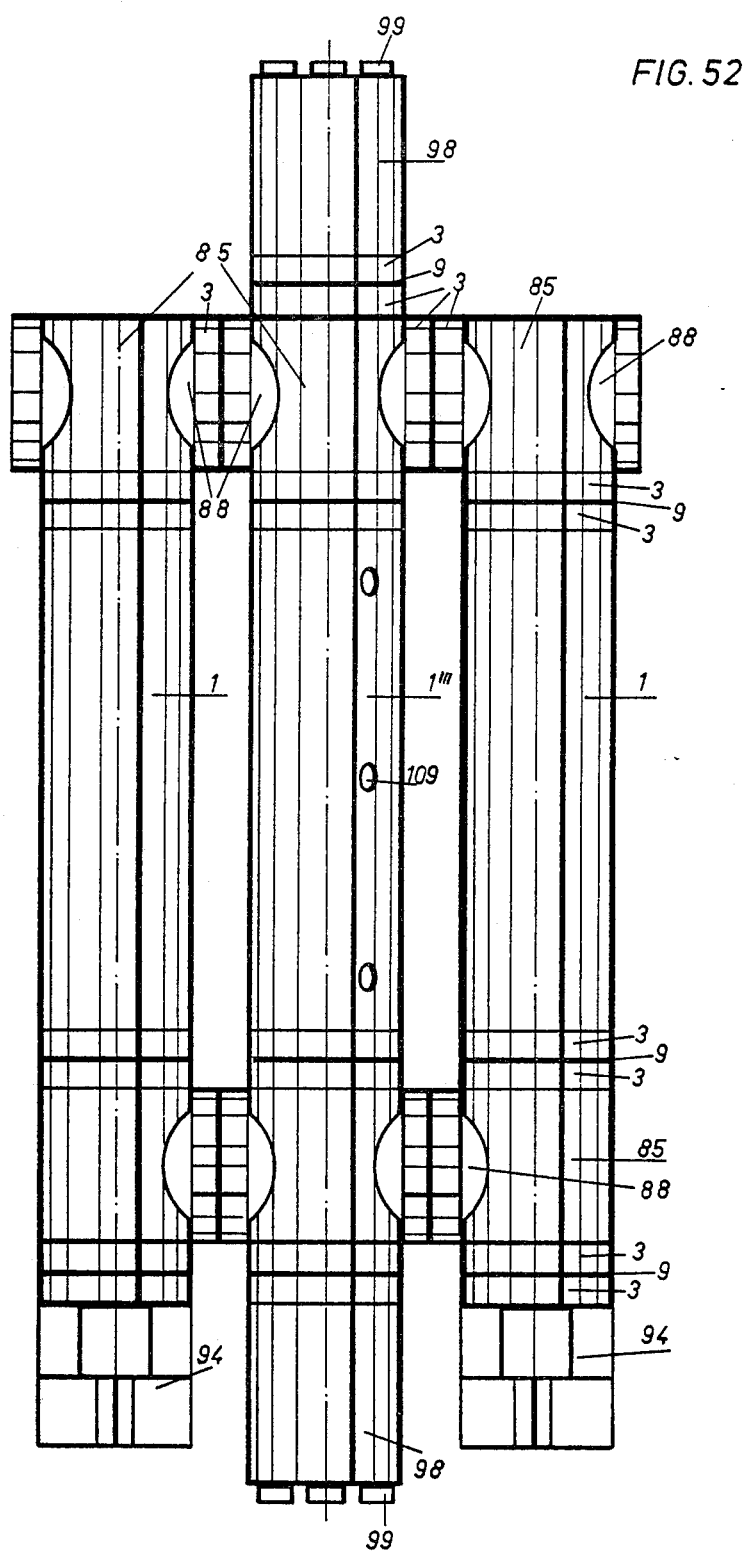

FIG. 52 shows a space station with two propulsion units consisting of three space depots.

Sheet 1:

FIG. 1 shows in side elevational view the circularly-shaped connecting plate 3 of space depot 1 with the outer enclosure 2, the two-part closure 7 and the associated closure guide 8; portholes are designated 109.

In FIG. 2, the two halves of closure 7 are moved outwardly and provide access to operating room 5. The track is designated 22, the space shelf 6, and the height of the operating room is indicated by d.

FIG. 3 shows a plan view of space depot 1. The outer encloure is designated 2, the connecting plate 3, the hatches 13 and the portholes 109. The outer diameter is indicated by D and the total length by L.

FIG. 4 shows a horizontal section in plane A–B of FIG. 2 of space depot 1. Cellular structure 4 consists of annular girders 19 and 20 spaced apart by distances T and interconnected by elongted beams 21. The outer enclosure is designated 2, the radial shelf 6, the storage room walls 15, the depth of the storage rooms LT, the width of the storage rooms LB. Operating room 5 has the diameter d. The track is indicated by 22 and the rack by 64. The two connecting plates have thickness s. The closures are designated 7. The illustrated space depot has a total of 126 storage rooms 14 for receiving space pallets 66.

FIG. 5 is a longitudinal section of the coupling position of two space depots 1 connected with each other. Coupling ring 9 is arranged between the two connecting plates 3; it has two like outer conical parts which form a fixed and tight connection with associated inner conical parts of connecting plate 3. The closures are designated 7 and can be opened and closed independently of each other in the coupled space depots, too.

FIG. 6 shows a more detailed illustration of the coupling position. The two inner conical parts of connecting plate 3 accurately conform to the outer conical parts of coupling ring 9. The connecting bolts are designated 10. The left half of the figure shows a section of connecting plate 3 and a closure 7. The rectilinear guide for the closure is designated 8, the annular gasket 11, the groove in the closure 12.

Sheet 2:

FIG. 7 shows a transverse section and FIG. 8 a corresponding partial longitudinal section of space depot 1. The outer annular girders are designated 19 and the inner annular girders 20, the longitudinal beams 21, the outer enclosure 2 and a hatch 13. The radial shelf 6 consists of seven radially arranged storage rooms 14 with walls 15. LB is the width of the storage rooms, L the depth of the storage rooms and LH designates the height of the storage rooms to define the size of a storage room 14. All storage rooms 14 are accessible from octagonal, prismatic operating room 5 whose lowest surface serves as track 22. The compartment 14' therebelow serves to hold subsidiary systems 30. The wedge-shaped spaces are designated 18.

FIGS. 9 and 10 are transverse and longitudinal sections of a built-in laboratory 23. The bottom of the cell 90 is connected with the outer annular girder 19 and track 22 runs in the cell floor. The ceiling of the cell is designated 89, the working room 24, the astronaut 26, the instruments 27, the table surface 25 and the production apparatus 28. Ducts 32, control installations 33, subsidiary systems 30 and pressurized container 31 are stored in bottom room 29.

FIGS. 11 and 12 show a built-in living quarter 34 in transverse and longitudinal sections. A sleeping cabin with two beds is designated 35, the living room 36, a corridor 37 and the track 22.

Sheet 3:

FIG. 13 is a transverse section and FIG. 14 is a partial horizontal section of space depot 1 with a space servicing unit 38. The outer enclosure is designated 2, the hatch 13, the outer annular girder 19, the inner annular girder 20, the track 22, the operating room 5, the storage rooms 14, their walls 15, the connecting frame 16 for the pallets, the clamping grooves 17, the wedge-shaped spaces 18, the space pallets 66, their front plates 67 and the locking devices 68. The bottom space is designated 29, a container 31, a duct 32, a hydraulically movable solar cell 106. The shelf servicing unit 38 consists of the chassis 39, running wheels 40, sprocket 43, base frame 45, instrument box 46, pivotal arm 48, telescoping slide 49, instrument slide 50, bushing 52 for receiving the pallet, ring gear 62. Further visible are: holding jaws 76. The rack is designated 64, the propulsion bundles 105. The movements of the shelf servicing unit 38 are designated as follows: X = the rotary movement of instrument block 44, $X_1$ = the pivotal movement of pivotal arm 48, $X_2$ = the pivotal movement of fork-shaped arm 51, $X_3$ = the pivotal movement of bushing 52 for receiving the pellet, Y = the longitudinal movement of telescoping slide 49, Z = the longitudinal movement of shelf servicing unit 38.

Sheet 4:

FIG. 15 is a side elevational view of a space shelf servicing unit 38. It consists of chassis 39, running wheels 40, lateral guide rollers 41, lower guide rollers 42, drive sprocket 43, pivotal instrument block 44, base frame 45, instrument box 46, the bearing with drive 47 for pivotal arm 48, telescoping slide 49, instrument slide 50, forked arm 51, bushing 52 for receiving the pallet, the tubular shaft with conical part 53, the rotary polygonal shaft 54, slide wedges 55, instruments 56, control levers 57, the driver's seat 58 with arm rests and back rest, with protective helmet, the energy supply 59, drive motor 60, pinion 61, gear wheel 62 and braking device 63. The track 22 is shown in section, the rack is designated 64. The rotary movements correspond to those in FIGS. 13 and 14; in addition, the following movements are new: $X_4$ = the rotary movement of polygonal shaft 54, $Y_1$ = the longitudinal movement of instrument slide 50, $Y_2$ = the longitudinal movement of tubular shaft 53.

FIG. 16 shows the transverse section and FIG. 17 the plan view of track 22 with the wheel arrangement of the shelf servicing unit 38 illustrated in simplified form. The running wheels are designated 40, the lateral guide rollers 41, the lower guide rollers 42, the drive sprocket 43, the rack 64 and the C-shaped intermediate portion of the track 22 is designated 65.

FIG. 18 elucidates the construction of bushing 52 of servicing unit 38 for receiving the pallet and the locking device 68 of a space storage container 77. The busing 52 for receiving the pallet consists of a tubular shaft 53 with tapered socket 72, rotatably journaled polygonal shaft 54 and slidable spreading wedges 55. The bushing is engaged with locking device 68 which consists of housing 69 with bore 70, two inclined wedge grooves 71, gear wheel 73 with inner teeth 74 and planar teeth 75. Teethed fixing jaws 76 engage gear wheel 73 which are longitudinally slidable in direction $Y_3$ and move into wedging groove 17 of connecting frame 16 whereby they fixedly connect the pallet with shelf 6. The front plate of the pallet is designated 67, the storage room 14 and the storage room walls 15.

Sheet 5:

FIG. 19 shows the square front plate 67 of a space pallet 66. The locking device is designated 68, the bore 70, the two invisible inclined wedging grooves 71 and the four adjustable fixing jaws 76.

A rectangular front plate 67 of an enlarged pallet 66, which carries two locking devices 68 with six fixing jaws 67, is illustrated in FIG. 20.

A front plate 67 with instruments 107, switches 108, locking device 68, bore 70 and four fixing jaws 67 of a space pallet 66 are illustrated in FIG. 21.

FIG. 22 shows a circular embodiment of a front plate 67.

In FIG. 23, a space pallet 66 with a storage container 77, a front plate 67, a locking device 68 and fixing jaws 76 is shown.

The space pallet 66 according to FIG. 24 consists of an open supporting surface 79 with a parcel 83 shown in broken lines.

The space pallet 66 shown in FIG. 25 has a support surface 79 which is mounted on a telescoping moving device 80.

FIG. 26 shows a space pallet 66 with storage tank 82 which is fixed by fasteners 84 to front plate 67.

An octagonal space pallet 66 with two front plates 67 and a storage container 77 are shown in FIGS. 27 and 28.

FIG. 29 illustrates a space pallet 66 with a closable storage container 77. The front plate is designated 67, the locking device 68, the bore 70 and the four fixing jaws 76.

The space pallet 66 shown in FIG. 30 carries a research apparatus 27 on its open support 79.

A space pallet 66 loaded with different parcels 83 is shown in FIG. 31. The fastening means are designated 83.

Chest of drawers 81 in FIG. 32 serves for the secure storage of small parts, tools, instruments and the like. The space pallet is designated 66 and the front plate 67.

Sheet 6:

FIG. 33 shows a transverse section of a coupling cell 85 with a turntable 91 with a built-in track portion 22' mounted centrally in the plane of track 22. This coupling cell also has two built-in transverse connections 86 with connecting flanges 87 extending transversely to main drive direction Z, the transverse connections having a diameter D'. A connecting ring 88 is fastened to the right connecting flange 87, the ring having at one end a connecting plate 3 with a closure 7 and an inner conical part. The ceiling of the cell is designated 89, the floor of the cell 90, a track bridge 92.

A side elevational view of coupling cell 85 is shown in FIG. 34. A connecting plate 3 is shown at both ends, the turntable 91 with track portion 22' in the center, the track portion having a height $H_1$, the transverse connection 86, the connecting flange 87 with diameter D'.

FIG. 35 illustrates in plan view the horizontal section of coupling cell 85 to which are connected two space depots 1 and an outer space platform 94. Only connecting plate 3 and coupling ring 9 of one space depot are visible. A portion of the space depot 1 is visible which is connected at a right angle or transversely by means of connecting ring 88. The transverse connection is designated 86, the connecting flange 87, the turntable 91, the track 22, the storage room 14, the track bridge 92 and the closure 7. The rotary movement of turntable 91 is designated $X_5$, the main drive direction Z. The connected outer space platform 94, whose front view is shown in FIG. 36, consists of connecting plate 3, lock 95, the two closure halves 7 with portholes 109, the upper outer platform 96 having a height $H_2$, the lower outer platform 97 having a height $H_1$, track 22. The parcels are designated 83.

Sheet 7:

The essential structural parts are shown here in simplified form.

FIG. 37 shows a space depot 1 of length L, FIG. 38 a shortened version thereof, having length L', and FIG. 39 shows a front view, D indicating the outer diameter of the depot and d' the diameter of closure 7.

FIG. 40 shows a section and FIG. 41 a front elevational view of coupling ring 9 having a width s and a diameter D.

FIG. 42 shows a coupling cell 85 with two transverse connections 86. The length is L".

Connecting ring 88 is shown in FIG. 43. The connecting plate 3 has a diameteer D, the recessed portion a diameter D'. The total length is designated s'.

FIG. 44 and FIG. 45 show two different views of an outer platform 94 illustrated in simplified form. The length is L". The length of the lower platform 96 is designated a and that of the upper platform 97 is designated b. The heights of the platforms are indicated $H_1$ and $H_2$.

FIG. 46 shows a side elevational view of propulsion cell 98 with propulsion units 99. The connection plate is designated 3.

FIG. 47 shows the embodiment of a space transporter 100 for transporting the space depot 1. The tail 101 carries propulsion units 99 and may be pivoted upwardly so that the depot positioned in the fuselage of the transporter, which has the length L, may be moved out.

FIG. 48 shows a space transporter 102 for the pallet according to the invention. It has a radial shalf installation 6' with storage rooms in its fuselage, pallets, a track and a connecting plate 3. Its tail carries propulsion unit 99 and is pivotal upwardly.

In FIG. 49, a space pallet transporter 102 is fixedly connected with a space depot 1. For this purpose, the tail 101 has been pivoted upwardly. The connection of the two flight bodies is effected by connecting plates 3 by means of coupling ring 9. Since the shelf installations of pallet transporter 6' and space depot 6 are identical, loading the pallets 66 between transporter 102 and space depot 1 may be effected by means of the space shelf control unit 38. FIG. 50 shows a space rescue flight apparatus having a tail diameter d, which may be connected, for example, to lock 95.

Sheet 8:

FIG. 51 shows a space station for research and production according to the invention, which consists, for example, of four space depots 1 arranged in a square. The space depots are equipped differently — 1' designating a space depot with laboratory and production apparatus and 1" a space depot with quarters for the crew. The four space depots are connected by four coupling cells 85 in a manner holding them fixed against torsion, the transversely positioned space depots being coupled by connecting rings 88. Two outer space platforms 94 are at the rear ends of the coupling cells. A space pallet transporter 102 is coupled to the left front end while a space rescue flight apparatus 103 is at the right end. The space station has eight projecting solar cell fields 106.

Sheet 9:

FIG. 52 shows a three-part space flight body consisting of two normal space depots 1 and a space depot 1''' with laboratory devices and quarters. The connection is effected here, too, by means of coupling cells 85. This space station further has two outer platforms 94 and two propulsion cells 98.

The examples described in the drawings show only a small selection of the construction possibilities for a space depot according to the invention and its auxiliary parts.

I claim:

1. A manned space flight body comprising
   (a) a cylindrical shell defining an axially extending, elongated cell,
   (b) a shelf construction built into the cell and including means for receiving and supporting pallets, the shelf construction having a shape resembling a hollow prism and being comprised of a plurality of individual, radially extending and axially storage rooms for life support systems, power supply systems, flight control systems, laboratory systems, production systems, and other systems used in space flight,
   (c) an axially extending operating room in the free center of the cell and surrounded by the shelf construction, all the storage rooms being accessible from the central operating room and the operating room being arranged to permit movement therethrough for access to the storage rooms,
   (d) a track running through the operating room, and
   (e) a self-propelled servicing unit mounted on the track for movement to and from respective ones of the storage rooms,
      (1) the servicing unit comprising a carriage mounted for movement along the track and held thereon against lateral and vertical displacement, and an operating station mounted on the carriage for rotation about an axis extending prependicularly to the carriage.

2. The manned space flight body of claim 1, further comprising a track and a vehicle supported on the track for movement through the operating room, the operating room having the shape of a regular polygon in transverse section, the track being arranged along one side of the polygon and radially inwardly extending ends of the storage rooms forming the outer side of the polygon.

3. The manned space flight body of claim 1, wherein the shelf construction comprises a plurality of axially extending shafts, each shaft being defined by side walls respectively enclosing three sides of the storage rooms, and further comprising a connecting frame for a pallet between two of said side walls at a fourth side of the storage rooms and facing the central operating room, and a pallet extending into respective ones of the storage rooms from the connecting frame.

4. The manned space flight body of claim 3, wherein each pallet comprises a front plate carrying a locking mechanism including fixing jaws cooperating with the connecting frame.

5. The manned space flight body of claim 1, further comprising connecting plates at respective ends of the hollow cylindrical body for closing the cell, each connecting plate including a closure door, guide means for moving the closure door between open and closed positions, and a conical portion.

6. The manned spaced flight body of claim 5 coupled to a like space flight body, respective ones of the connecting plates of the two space flight bodies being arranged with their conical portions adjacent each other, further comprising a coupling ring arranged between the conical portions.

7. The manned space flight body of claim 1, further comprising a laboratory installation built into the cell in addition to the shelf construction, instrumentalities removably arranged in the laboratory installation and laboratory instrumentalities stored in respective ones of the storage rooms for replacing instrumentalities removed from the laboratory installation.

8. The manned space flight body of claim 1, further comprising crew quarters built into the cell in addition to the shelf construction.

9. The manned space flight body of claim 1, further comprising a propulsion unit coupled thereto, a connecting plate at the end of the hollow cylindrical body for closing the cell and carrying the propulsion unit.

10. A manned space flight body comprising
   (a) a cylindrical shell defining an axially extending, elongated cell,
   (b) a shelf construction built into the cell and including means for receiving and supporting pallets, the shelf construction having a shape resembling a hollow prism and being comprised of a plurality of individual, radially extending and axially adjacent storage rooms for life support systems, power supply systems, flight control systems, laboratory systems, production systems, and other systems used in space flight, and
   (c) an axially extending operating room in the free center of the cell and surrounded by the shelf construction, all the storage rooms being accessible from the central operating room and the operating room being arranged to permit movement therethrough for access to the storage rooms, the manned space flight body being coupled to a like space body to form a space station, further comprising a coupling cell between the space flight bodies and interconnecting the cells thereof, the coupling cell extending substantially perpendicularly to the cells of the space flight bodies, tracks for supporting a vehicle for movement through the operating rooms of the cells of the space flight bodies, a track for supporting the vehicle for movement through the coupling cell, a turntable arranged in said coupling cell, between the tracks of the space flight bodies, and coupling rings for coupling the space flight bodies to the coupling cell.

11. A manned space flight body comprising
(a) a cylindrical shell defining an axially extending, elongated cell,
(b) a shelf construction built into the cell and including means for receiving and supporting pallets, the shelf construction having a shape resembling a hollow prism and being comprised of a plurality of individual, radially extending and axially adjacent storage rooms for life support systems, power supply systems, flight control systems, laboratory systems, production systems, and other systems used in space flight,
(c) an axially extending operating room in the free center of the cell and surrounded by the shelf construction, all the storage rooms being accessible from the central operating room and the operating room being arranged to permit movement therethrough for access to the storage rooms,
(d) a connecting plate at an end of the hollow cylindrical body for closing the cell,
(e) a space platform mounted on the connecting plate, the platform consisting of a lower and upper platform portion,
(f) a lock leading from the connecting plate to the platform, and
(g) a track on the platform.

12. A manned space flight body comprising
(a) a cylindrical shell defining an axially extending, elongated cell,
(b) a shelf construction built into the cell and including means for receiving and supporting pallets, the shelf construction having a shape resembling a hollow prism and being comprised of a plurality of individual, radially extending and axially adjacent storage rooms for life support systems, power supply systems, flight control systems, laboratoty systems, production systems, and other systems used in space flight,
(c) an axially extending operating room in the free center of the cell and surrounded by the shelf construction, all the storage rooms being accessible from the central operating room and the operating room being arranged to permit movement therethrough for access to the storage rooms,
(d) a track running through the operating room, and
(e) a self-propelled servicing unit mounted on the track for movement to and from respective ones of the storage rooms, the servicing unit including a carriage, wheels mounting the carriage for movement along the track, guide rollers for holding the carriage on the track against lateral and vertical displacement, a rack-and-pinion drive for moving the carriage along the track on the wheels, a chassis mounted on the carriage, a power-driven rack-and-pinion drive for rotating the chassis on the carriage about an axis extending substantially perpendicularly to the track, a power source on the chassis, braking means for stopping the chassis in a selected rotational position, an instrument box mounted on the chassis, indicating instruments on the box, control levers on the box, an operator's seat with arm rests, a back rest and a protective helmet mounted on the chassis and facing the instrument box, and mounted on the instrument box a pivotal carrying arm, a drive for pivoting the carrying arm, a telescoping slide carried by the carrying arm, a sliding element on the telescoping slide, a forked arm mounted on the sliding element and a bushing for receiving a pallet mounted on the forked arm.

13. The manned space flight body of claim 12, wherein the pivotal carrying arm is mounted for pivoting about an axis extending substantially parallel to the direction of the movement of the carriage along the track, the forked arm is mounted on the sliding element for pivoting about in a first plane substantially perpendicular and parallel to the track, the bushing is mounted on the forked arm for pivoting in said plane, a shaft of polygonal cross section is journaled in the bushing for rotating about an axis extending in said plane and is adapted to receive the pallet, the telescoping slide is mounted on the carrying arm for sliding in a second plane substantially perpendicular to the first plane and to the track, the sliding element is mounted on the telescoping slide for linear movement in the second plane, and a tubular shaft journals the polygonal shaft in the bushing for linear movement therein.

14. The manned space flight body of claim 13, further comprising pallets extending into respective ones of the storage rooms, each of the pallets comprising a front plate carrying a locking mechanism including fixing jaws, the storage rooms having connecting frames for cooperating with the fixing jaws, and the locking mechanism being arranged for attachment to, and detachment from the polygonal shaft, attachment and detachment being effected by the linear movement of the shaft in the bushing.

* * * * *